United States Patent Office 3,249,531
Patented May 3, 1966

3,249,531
TREATMENT OF AROMATIC EXTRACTS
Norbert Schneider, Hamburg-Wilhelmsburg, Germany, assignor to The British Petroleum Company Limited, London, England, a British joint-stock corporation
No Drawing. Filed July 20, 1962, Ser. No. 211,384
Claims priority, application Germany, July 25, 1961, O 8,179
8 Claims. (Cl. 208—311)

The present invention relates to a process for the treatment of extracts rich in aromatics obtained by the selective solvent extraction of mineral oils. The products obtained are suitable for special uses because of their particular properties, for example their heat stability and resistance to radiation.

For many uses, especially in lubrication technology, it is necessary to free distillate oils to a large extent from aromatic compounds, principally in order to improve their viscosity/temperature behavior and also to improve their aging characteristics. This may be carried out by a process of selective solvent extraction, which provides on the one hand products rich in aromatics which are known as "extracts" and on the other hand the extracted oils which are designated "raffinates."

Crude oils from different sources contain varying quantities of normal paraffinic hydrocarbons which may be a nuisance because of their high solidification point and which may, therefore, have to be removed, for example by known de-waxing processes, either before or after the previously mentioned solvent extraction.

A large number of solvents have already been proposed or have been used for solvent extraction and de-waxing, for example phenol, liquid sulphur dioxide, nitrobenzene and furfural for the former, and ketones, chlorinated hydrocarbons and benzene/sulphur dioxide for the latter. These processes are based on the different solvent capacities of the solvents for the various groups of substances contained in the petroleum fractions. For example, phenol, liquid sulphur dioxide and furfural possess a high solvent capacity for aromatics and a restricted solvent capacity for the other groups of hydrocarbons.

In the process of the present invention, extracts obtained by the selective solvent extraction of mineral oils are used as the initial material, for example extracts obtained by the solvent extraction of low-viscosity (spindle oil) fractions or other machine oil fractions. The extracts consist predominantly of aromatic hydrocarbons and in addition may contain more than 10 but less than 50 percent of paraffinic, naphthenic and hydroaromatic hydrocarbons, as well as other alicyclic, aromatic and heterocyclic compounds.

Extracts obtained from solvent extraction processes generally have an undefined and varying composition, as well as various other unfavorable properties, for example their dark color and high tendency to age.

It is known that such extracts can be improved by refining techniques such as distillation or hydrogen treatment, for example in order to brighten their color, but these processes only bring about a change in a few individual properties and do not effect this change to an advanced degree.

The present invention provides a process for substantially completely resolving extracts into their constituent groups of substances. The process of the present invention may be employed in conjunction with suitable after-treatments in order to upgrade the separated groups of substances to yield high-grade special products.

According to the present invention a process comprises mixing an extract rich in aromatics, and obtained by the selective solvent extraction of a mineral oil, with a solvent selective for aromatics and subjecting the mixture to a low temperature fractional crystallization step and recovering a fraction consisting substantially exclusively of aromatics and one or more fractions containing naphthenes and isoparaffins.

Whereas in selective solvent extraction processes aromatics are dissolved out because of their good solubility, for example, in furfural, according to the process of the present invention separation is achieved by fractional crystallization. This is carried out by using solvents having polarities different to the materials being separated and whose solidification points are below the particular operating temperature employed, in conjunction with suitable low temperatures of preferably —20° C. and below. The fractions obtained may be subjected if desired to a hydrogenation step and/or to other known refining processes.

In the process of the present invention the separation of the paraffins and naphthenes may be carried out by cooling in a number of stages with intermediate filtrations. The extract feedstocks are advantageously subjected to a distillation prior to the fractional crystallization in order to eliminate high-molecular bituminous products which have a troublesome effect on the fractional crystallization and which also reduce the purity of the fractions resulting from the separation. The quantity of such heavy material which it is necessary to separate during the distillation increases generally as the molecular weight of the extracts increases, assuming that the required quality of product remains the same. Thus, for example, in the distillation of light machine oil extracts approximately 7% of heavy material is removed, whereas in the distillation of heavy machine oil extracts approximately 11% of heavy material is removed. An alteration in these percentages influences the quality of the fractions obtained by a subsequent fractional crystallization. When less heavy material is removed, the fractional crystallization becomes more difficult due to the formation of amorphous precipitates. The distillation is advantageously carried out at absolute pressures of 0.1 to 10 mm. Hg and the end boiling point is set in the case of spindle oil extracts at 270° C. (at 10 mm. Hg) and in the case of light machine oil extracts at 280° C. and in the case of heavier extracts at 330° C. (both at 0.1 mm. Hg). However, it is also possible for the distillation to be carried out at atmospheric pressure.

The table below shows the change in the properties of a light machine oil extract distillate residue as the yield of residue increases.

TABLE

| End boiling point of extract distillate fraction II | 286°/ 0.5 mm. mercury | 284°/ 0.5 mm. mercury | 275°/ 0.6 mm. mercury | 268°/ 0.6 mm. mercury | 260°/ 0.5 mm. mercury | 253°/ 0.4 mm. mercury |
|---|---|---|---|---|---|---|
| Percent by weight residue (bituminous fraction) | 2.8 | 4.4 | 5.2 | 5.8 | 6.8 | 10.7 |
| Sulphur, weight percent | 6.02 | 6.16 | 5.91 | 6.03 | 6.0 | 6.07 |
| RuK. °C. ASTM test D 36-26 | +58.4 | +44.0 | +39.0 | +35.5 | +27.6 | +17.7 |
| Breaking point, °C. Fress breaking point I.P. test 80/53 | +10 | +0 | −1 | −6 | −19 | −18 |
| Penetration mm./10 at 25° | 90 | 50 | 133 | 182 | | |

The extract distillate fractions intended for the separation may be advantageously dissolved in a solvent having an extractive action and possessing polar properties. Then the mixture is slowly cooled. The first compounds which crystallize out are normal paraffins and iso-paraffins which are filtered off. On further cooling the filtrate, naphthenes and a part of the hydroaromatic compounds are crystallized, which are also filtered off. The filtrate now contains only aromatic compounds and a small portion of the hydroaromatic compounds, and may be freed from solvent by distillation and is then designated below as the aromatic fraction.

This is the description of the single-stage mode of operation. By repeating the process several times for each of the three fractions (multi-stage mode of operation) a correspondingly higher total separation is obtained.

For the purpose of separating the paraffins from the naphthenes and separating the latter once again from the aromatics, polar inorganic or organic solvents are used whose solidification points are below the working temperature of the process. It is also possible to operate with solvent mixtures, for example with a mixture of acetone and low-molecular aliphatic alcohols, especially with methyl alcohol. When doing this use is made of polarity differences between the individual solvents for the specific separation, and definite temperature ranges are employed according to the specification requirements regarding the end point.

The operating temperatures of the separating process are usually higher when using solvent mixtures, which favors the economy of the process. Thus the separation end temperature for heavy machine oil extract distillate when using pure actone is about −35° C., but if a mixture of 95% acetone and 5% methyl alcohol is employed suitable products are obtained with a separation end temperature of −20° C. (see Example 1).

The separation end temperature is understood to be the temperature at which the major part of the naphthenic compounds have crystallized out, which can be detected from the values of the refraction index, the density and the saponification value or by an infrared spectrum.

The solvents used are preferably organic substances which can enter into polar exchange action with the compounds to be separated. Suitable solvents include alcohols, aldehydes, ketones, acids, aromatic or hydroaromatic compounds which possess a sufficiently low solidification point whilst at the same time possessing sufficient solvent capacity for aromatics. It has been found that the addition of up to 5% of water has a beneficial influence on the cold separation.

Mixtures of varying composition of acetone/water, acetone/methyl alcohol, ethyl alcohol, propyl alcohol and isopropyl alcohol; acetone/acetic acid; acetone/ethyleneglycol; acetone/benzyl alcohol; acetone/benzaldehyde and benzaldehyde/benzyl alcohol and especially acetone/furfural have been found to be particularly suitable.

The separation of extract distillates into paraffinic, naphthenic and aromatic fractions can be controlled by the the use of different solvents and solvent mixtures, by changing the extract/distillate/solvent proportions and by changing the temperatures of separation. By adjustment of the conditions a sharp or less sharp separation of the individual classes of substances can be obtained. Thus, for example, when using pure acetone the proportion of extract distillate to solvent for spindle oil extracts is between 1:2 and 1:20 and that for light and heavy machine oil extract distillates is between 1:2 and 1:15.

The higher the proportion of extract to solvent which is chosen, the purer is the naphthene fraction, which can be seen in an increasing saponification number, a decreasing refraction index, and a decreasing specific gravity, and the more impure becomes the resultant aromatic fractions (see Example 2).

The fractions obtained are preferably subjected to a hydrogenation treatment which may be carried out under varying conditions. As the hydrogenation charge material will generally contain sulphur, it is advantageous to use sulphur-resistant hydrogenation catalysts. Sulphur-resistant hydrogenation catalysts of this kind include the oxides and sulphides of metals of the 6th group either alone or in admixture with oxides or sulphides of metals of the 2nd and 8th or metals of the 8th group of the Periodic Table, especially mixtures of molybdenum oxide, zinc oxide, magnesium oxide, nickel sulphide or nickel oxide, the molybdenum sulphides, tungsten sulphides on activated supports, iron sulphides on activated alumina or bauxite or the like.

The hydrogenation temperatures used are preferably between 190° and 400° C. The pressures which are advantageously used are within the range from 20 to 100 atmospheres gauge. It is possible to operate with a fixed-bed catalyst.

During the hydrogenation of the naphthene fractions, which is preferably carried out between 200 and 400° C. and about 20 to 100 atmospheres gauge, it is possible to reduce the sulphur to 0.1% and below and to lighten the color up to 1½ union and lighter. Under these temperature conditions types of white oil are obtained from naphthene fractions.

The hydrogenation of the aromatics is advantageously carried out between 250 and 400° C. at about 20 to 90 atmospheres gauge, the sulphur decreasing as the temperature rises.

The aromatic and naphthene fractions obtained by hydrogenation may be stripped in a distillation column of the usual construction to a given flashpoint or cut into distinct fractions. The temperature conditions in each case during the distillation will depend to a large extent on the quality requirements which are imposed on the naphthene and aromatic fractions.

It has been found that particularly favorable results are obtained if furfural or $SO_2$ extracts are used as the initial materials.

Of the products resulting from the separation process according to the present invention, viz. paraffins, naphthenes and aromatics, it is possible.

(1) To further process the paraffins according to known methods and to utilize the solid paraffins, for example, like the paraffin products obtained during the normal de-waxing of lubricating oil;

(2) The naphthenes, which behave in principle like naphthenic lubricating oil distillates, can be treated by the ordinary known processes used in the lubricating oil industry. They can be processed by thermal hydrogenation or acid treatment to form detergents, lubricants or base oils. The possibilities extend as far as white oil production.

The processing of naphthenes to form special lubricating oils ensures on the one hand the good economy of the process of the present invention as a whole and, on other hand, signifies an indirect increase in yield of utilizable products occurring during solvent treatment.

After treatment as described below, the aromatics are suitable as (a) Heat transfer oil,
(b) Radiation-resistant lubricating oils and lubricant greases, as well as moderator oils or additives for moderator oils of organically moderated nuclear reactors.

Special modes of operation are required for the production of the individual products.

(a) Heater transfer oils can be produced, according to the viscosity required, from spindle oil extracts, light or heavy machine oil extracts. They may be produced from either the aromatic fraction or a mixture of aromatic and naphthene fractions obtained from the extract separation described. Heat transfer oils with optimum properties are obtained by a mild hydrogenation which improves the thermal stability and the aging behavior. A similar effect is obtained—although under considerably less favorable conditions as regards economy—by hot treatment with fuller's earth (Example 3).

(b) For the production of radiation-resistant base oils, which can be used for the production of radiation-resistant lubricating oils or radiation-resistant greases, the aromatic fractions obtained by the separation described above are preferably employed, because the naphthene fractions generally have too great a tendency to form olefins during irradiation. The aromatic fractions may be subjected to the following treatment:

(1) An acid treatment, and/or
(2) A fuller's earth hot treatment, and/or
(3) A hydrogenation (Example 4).

The invention is illustrated by means of the following examples.

*Example 1*

An extract obtained from the furfural extraction of heavy machine oil distillate was subjected to a vaccum distillation. The distillate so obtained was thinned with 8 parts acetone and subjected to cold separation of $-35°$ C. A yield of 50.2% of an aromatic fraction was obtained together with a yield of 49.8% of a naphthene fraction.

The same distillate was diluted with 4 parts of a mixture which consisted of 95% acetone and 5% methyl alcohol and was subjected to a cold separation at $-20°$ C. An aromatic fraction and a naphthene fraction were again obtained. The physical/chemical properties of the individual fractions were measured and are shown in the following table.

| Type of product | Distillate from heavy machine oil extract | Aromatics from heavy machine oil extract | Aromatics from heavy machine oil extract |
|---|---|---|---|
| Dilution used | | 1:8 (100% acetone) | 1:4 (95% acetone + 5% methyl alcohol) |
| $d_4^{20}$ refractive index | 1.0105 | 1.0540 | 1.0590 |
| $n_D^{20}$ | 1.5725 | 1.6060 | 1.6108 |
| Percent sulphur | 5.30 | 6.41 | 6.39 |
| Iodine value | 8.75 | 14.72 | 12.19 |
| E° 50 | 65.6 | 85.5 | 193.9 |
| Viscosity index | $-85$ | $-258$ | $-375$ |
| Yield, percent by wt | 73 | 50.2 | 32.0 |

Both aromatic fractions where subjected to a hydrogenation. They were diluted one:one with benzene and were hydrogenated at 273° C. and 20 atmospheres with a throughput speed of 1 vol./vol./hour. Both products were then stripped at 150° C.

The infrared spectra of the two products show only unimportant differences between them.

*Example 2*

An extract obtained in the treatment of light machine oil distillate with furfural was subjected to vacuum distillation. The distillate fraction obtained boiled between 140 and 171° C. under a vacuum of 0.6 to 0.8 mm. mercury. This distillate was subjected to a cold separation using firstly a dilution of 1:5 acetone and secondly a dilution of 1:10 acetone. The separation end temperature was $-60°$ C. During the separation with a dilution ratio of 1:5 a 49% of a fraction containing non-aromatics was obtained whereas during the separation with a dilution of 1:10 the yield of non-aromatic fraction was only 33%. However, using a dilution of 1:10 a fraction containing appreciably more naphthenes was obtained than with a dilution of 1:5. This was seen from the increasing viscosity index and the decreasing specific gravity.

The physical and chemical properties are shown in the table which follows::

| | 1:5 | 1:10 |
|---|---|---|
| Dilution | | |
| Cst./100 | 33.4 | 28.6 |
| Cst./210 | 4.63 | 4.72 |
| Viscosity index | 27 | 87 |
| Pour point, ° C | $+5$ | $+10$ |
| $d/25$ | 0.9109 | 0.9101 |
| $C_A$ aromatic content, percent | 30 | 25 |
| $C_P$ paraffinic content, percent | 60 | 70 |
| $C_N$ naphthenic content, percent | 10 | 5 |
| Yield of non-aromatic fraction, percent | 49 | 33 |

*Example 3*

An aromatic fraction obtained by cold separation from light machine oil extract was hydrogenated over a catalyst comprising a mixture of cobalt, molybdenum, aluminum and iron oxides. The temperature was in the range from 250 to 450° C. and the pressure between 20 and 90 atmospheres gauge hydrogen. The same initial oil was heated for 2 hours at 200° C. together with 10% of fuller's earth. After this the earth was filtered off.

After 30 days' exposure to sunlight and air these oils showed only half the sludge formation compared with an untreated sample.

*Example 4*

The following results were obtained from fractions which had been treated with varying quantities of acid or earth at different temperatures or by hydrogenation before they were irradiated with high-speed electrons with a dose of $10^{-9}$ rad.

*Acid treatment.*—A prior acid treatment—10 to 50% treatment with concentrated sulphuric acid was used—brings about a marked decrease in the tendency to oxidation, although the tendency to form olefins is only slightly influenced by an acid treatment.

*Fuller's earth heat treatment.*—A prior heat treatment—the samples of oil were treated with 5 to 20% fuller's earth at temperatures between 150 and 250° C.—brings about a marked decrease in the tendency to the formation of olefins and also depresses very considerably the tendency to oxidation.

By a combination of acid and earth heat treatment it is possible to achieve a further improvement in the products as regards resistance to radiation as compared with a process using either treatment alone.

*Hydrogenation.*—A hydrogenation treatment—hydrogenation pressures of between 20 and 90 atmospheres gauge were used in a temperature range from 250 to 400° C. using metal oxide hydrogenation catalyst—appreciably reduces the tendency to oxidation on radiation and decreases the reactivity of the product. Aging reactions now only occur to a smaller extent. Of the known catalysts, it was found that a cobalt/molybdenum catalyst on aluminum oxide was very suitable. The products resulting from the hydrogenation were suitable as heat transfer oils.

I claim:

1. In a method for selective solvent extraction of mineral lubricating oils to obtain a raffinate component and an extract component, said extract component consisting predominantly of aromatics and containing in addition more than 10% but less than 50% of paraffinic, naphthenic and other alicyclic and heterocyclic compounds, the improvement of separating the extract fraction into a fraction consisting of aromatics and at least one other fraction containing naphthenes which comprises adding a solvent selective for aromatics to the said extract component to form a mixture consisting of the solvent and the extract component, said solvent having a solidification point below the separation end temperature of the process at which, when cooled, the major portion of the naphthenic components will crystallize out, cooling the mixture consisting of the extract component and solvent slowly to the separation end temperature to crystallize out by low temperature fractional crystallization at least the major portion of naphthenes, and recovering a fraction consisting essentially of aromatics and at least one other fraction containing naphthenes.

2. A process as claimed in claim 1 wherein the fractional crystallization is operated at a temperature of not higher than −20° C.

3. A process as claimed in claim 1 wherein the separation of the fraction containing naphthenes and isoparaffins is carried out in a number of cooling stages with intermediate filtrations.

4. A process as claimed in claim 1 wherein the extract feedstock is first subjected to a distillation step to remove high molecular weight bituminous compounds.

5. A process as claimed in claim 1 wherein the feedstock is an extract obtained by the treatment of a mineral oil with a solvent selected from furfural and sulphur dioxide.

6. A process as claimed in claim 1 wherein the solvent comprises at least one liquid taken from the group acetone, furfural and low molecular weight alcohols, with from 0–5% of water.

7. A process as claimed in claim 1 wherein the recovered fractions are subjected to a hot treatment with fuller's earth.

8. A process as claimed in claim 1 wherein the recovered fractions are subjected to a hydrogenation treatment.

References Cited by the Examiner
UNITED STATES PATENTS

| | | | |
|---|---|---|---|
| 2,370,297 | 2/1945 | Engel | 208—36 |
| 2,758,141 | 8/1956 | Findlay | 260—674 |

DELBERT E. GANTZ, *Primary Examiner.*

ALPHONSO D. SULLIVAN, PAUL M. COUGHLAN,
*Examiners.*

P. P. GARVIN, H. LEVINE, *Assistant Examiners.*